US010883346B2

(12) United States Patent
Enkababian et al.

(10) Patent No.: US 10,883,346 B2
(45) Date of Patent: Jan. 5, 2021

(54) METHOD OF PERFORMING A PERFORATION USING SELECTIVE STRESS LOGGING

(71) Applicant: SCHLUMBERGER TECHNOLOGY CORPORATION, Sugar Land, TX (US)

(72) Inventors: Philippe Enkababian, Richmond, TX (US); David Sobernheim, Greenwood Village, CO (US); Priyavrat Shukla, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 253 days.

(21) Appl. No.: 16/063,299

(22) PCT Filed: Dec. 19, 2016

(86) PCT No.: PCT/US2016/067608
§ 371 (c)(1),
(2) Date: Jun. 18, 2018

(87) PCT Pub. No.: WO2017/106867
PCT Pub. Date: Jun. 22, 2017

(65) Prior Publication Data
US 2018/0371883 A1  Dec. 27, 2018

Related U.S. Application Data

(60) Provisional application No. 62/269,396, filed on Dec. 18, 2015.

(51) Int. Cl.
*E21B 43/119* (2006.01)
*G01V 5/12* (2006.01)
(Continued)

(52) U.S. Cl.
CPC .......... *E21B 43/119* (2013.01); *E21B 47/007* (2020.05); *E21B 49/00* (2013.01); *G01V 5/12* (2013.01)

(58) Field of Classification Search
CPC ..................................................... E21B 43/119
(Continued)

(56) References Cited

U.S. PATENT DOCUMENTS 5,841,135 A 11/1998 Stoller et al.
7,042,802 B2 5/2006 Sinha
(Continued)

FOREIGN PATENT DOCUMENTS

EP       2884043 A2    6/2015
WO   2008089345 A1    7/2008
(Continued)

OTHER PUBLICATIONS

Slocombe, Robin, et al., "Eagle Ford completion optimization strategies using horizontal logging data", Unconventional Resources Technology Conference, Society of Exploration Geophysicists, American Association of Petroleum Geologists, Society of Petroleum Engineers, 2013, pp. 1351-1358. (Year: 2013).
(Continued)

*Primary Examiner* — Ricky Ngon
(74) *Attorney, Agent, or Firm* — Rodney Warfford

(57) ABSTRACT

A method of performing a perforation operation is disclosed. The method involves generating a stress contrast distribution for each stage of a well based on drilling stress data and a stress log of the well, generating a stress association between the drilling stress data and the stress log, generating a new stress contrast distribution for each of the stages of a new well based on new wellsite data (new drilling stress data) and the stress association, generating a production forecast using the geometric completion (GC) design and a predicted
(Continued)

production forecast based on the engineered completion (EC) design, comparing a cost of a new stress log of the new well with a change in revenue between the GC production forecast and the predicted production forecast, and selectively perforating the new well using either GC or EC design based on the comparing, whereby stress logging may be selectively performed.

17 Claims, 12 Drawing Sheets

(51) Int. Cl.
*E21B 47/007* (2012.01)
*E21B 49/00* (2006.01)

(58) Field of Classification Search
USPC .................................................. 702/8
See application file for complete search history.

(56) References Cited

U.S. PATENT DOCUMENTS

| | | | |
|---|---|---|---|
| 7,526,385 B2 | 4/2009 | Sayers | |
| 7,918,279 B2 | 4/2011 | Leising et al. | |
| 7,941,307 B2* | 5/2011 | Symington | E21B 49/006 703/10 |
| 8,126,646 B2 | 2/2012 | Grove et al. | |
| 8,540,024 B2 | 9/2013 | Kosarev et al. | |
| 8,812,334 B2* | 8/2014 | Givens | G06Q 10/06 705/7.11 |
| 8,874,376 B2 | 10/2014 | Soliman | |
| 9,228,425 B2 | 1/2016 | Ganguly et al. | |
| 2005/0149307 A1* | 7/2005 | Gurpinar | G06Q 10/06 703/10 |
| 2008/0091396 A1 | 4/2008 | Kennon et al. | |
| 2008/0209997 A1 | 9/2008 | Bailey et al. | |
| 2008/0262810 A1 | 10/2008 | Moran et al. | |
| 2012/0150515 A1 | 6/2012 | Hariharan et al. | |
| 2013/0140031 A1* | 6/2013 | Cohen | E21B 43/26 166/308.1 |
| 2014/0076543 A1 | 3/2014 | Ejofodomi et al. | |
| 2014/0214324 A1 | 7/2014 | Freedman et al. | |
| 2014/0222405 A1 | 8/2014 | Lecerf et al. | |
| 2017/0051598 A1* | 2/2017 | Ouenes | G06F 30/20 |
| 2017/0114616 A1 | 4/2017 | Enkababian et al. | |
| 2017/0306750 A1 | 10/2017 | Carpenter et al. | |

FOREIGN PATENT DOCUMENTS

| | | |
|---|---|---|
| WO | 2014032003 A1 | 2/2014 |
| WO | 2014066981 A1 | 5/2014 |
| WO | 2015006363 A1 | 1/2015 |

OTHER PUBLICATIONS

Miller, Camron K., George A. Waters, and Erik I. Rylander, "Evaluation of production log data from horizontal wells drilled in organic shales", North American Unconventional Gas Conference and Exhibition, Society of Petroleum Engineers, 2001, pp. 1-23. (Year: 2011).

Office Action issued in related U.S. Appl. No. 15/242,662 dated Aug. 10, 2018, 33 pages.

Slocombe, R. W. et al., "Eagle Ford Completion Optimization Using Horizontal Log Data", SPE 166242, SPE Annual Technical Conference and Exhibition, 2013, pp. 1-6.

International Search Report and Written Opinion issued in International Patent Appl. No. PCT/US2016/067608 dated Mar. 24, 2017; 11 pages.

International Search Report and Written Opinion issued in International Patent Appl. No. PCT/US2016/057448 dated Feb. 7, 2017; 14 pages.

Non-Final Rejection issued in Non-Provisional U.S. Appl. No. 15/242,662 dated Nov. 16, 2020; 41 pages.

\* cited by examiner

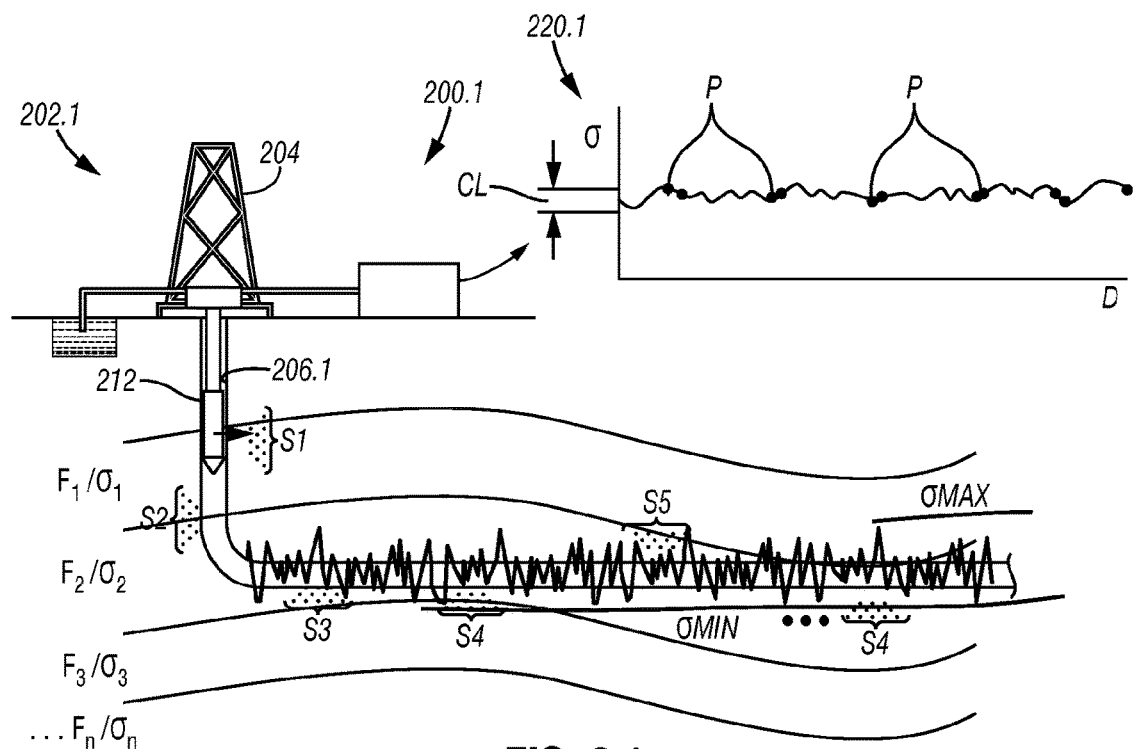
FIG. 2.1
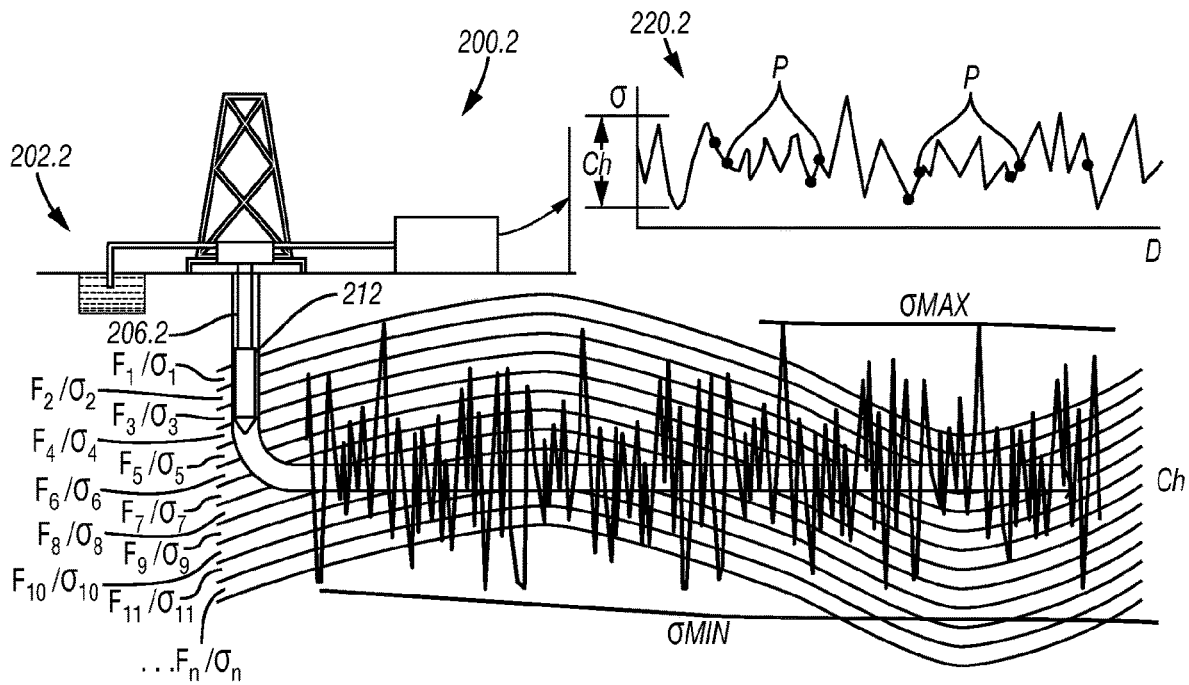
FIG. 2.2

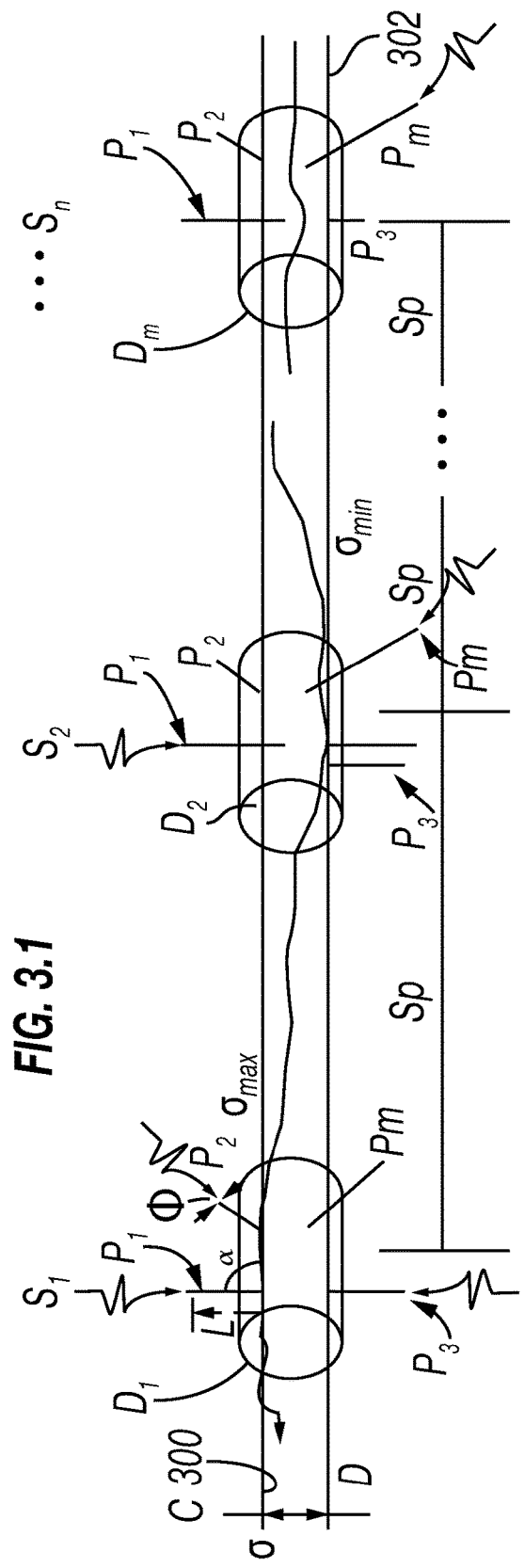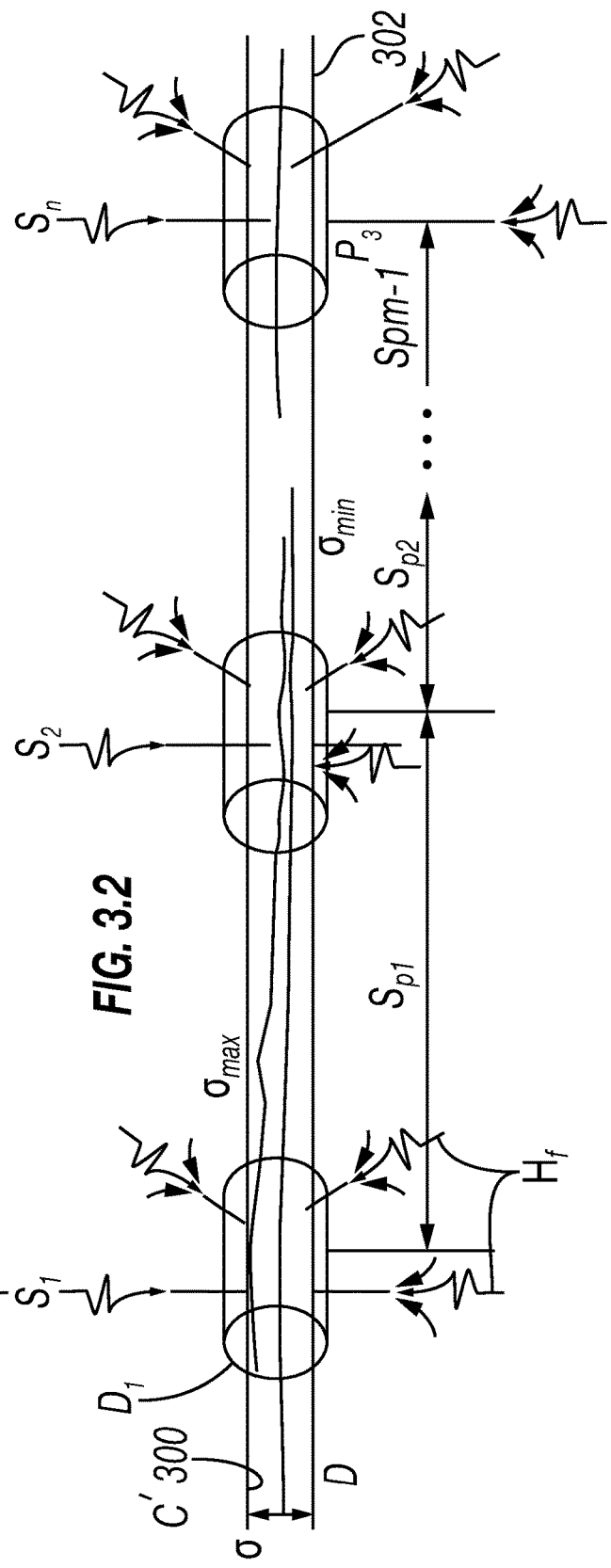

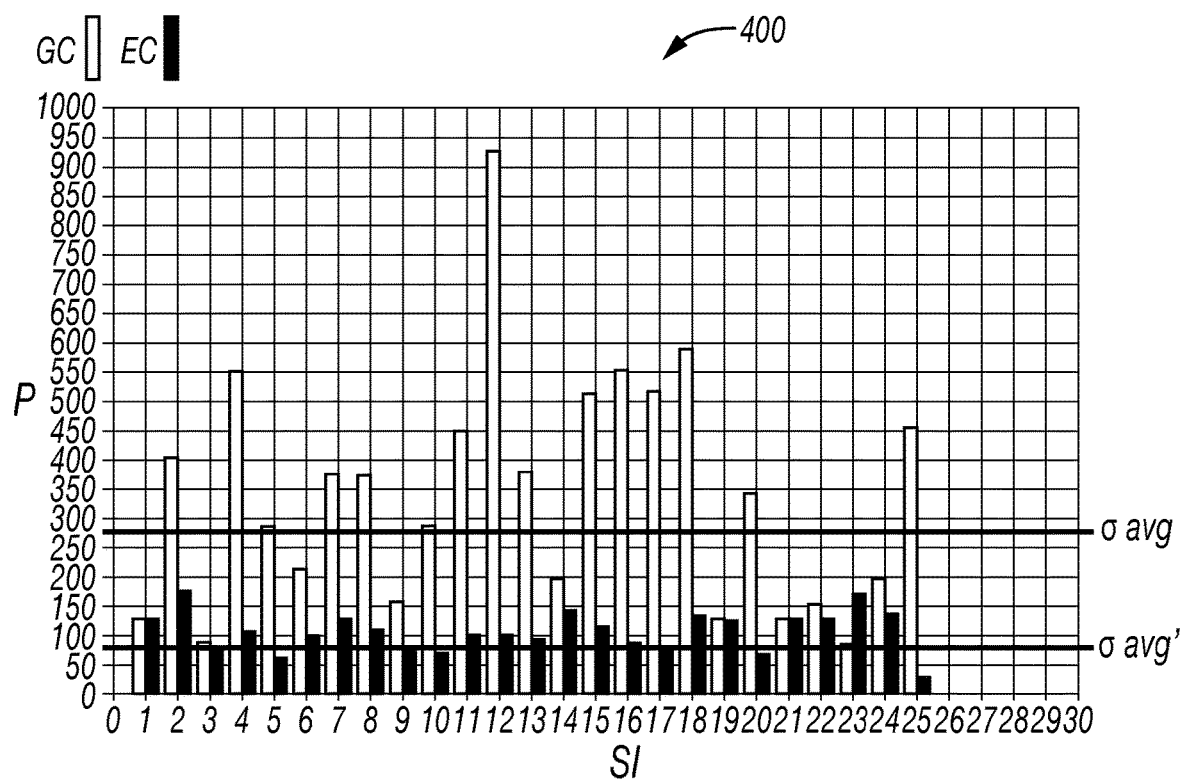
FIG. 4
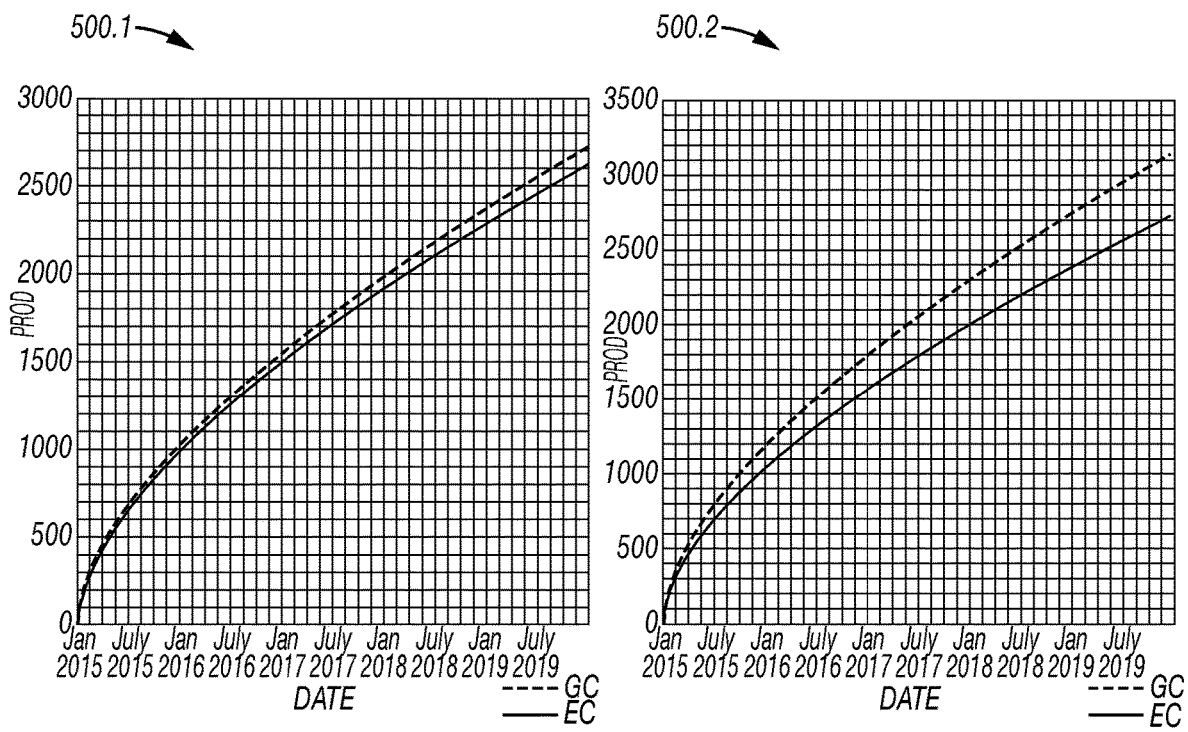
FIG. 5.1
FIG. 5.2

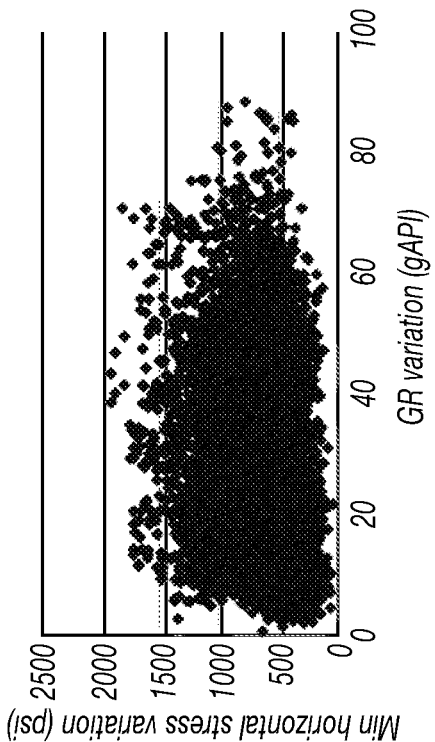
FIG. 6.2
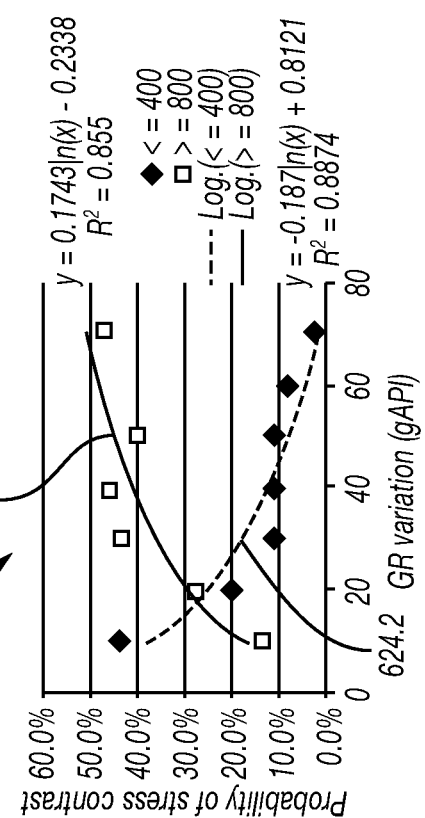
FIG. 6.4
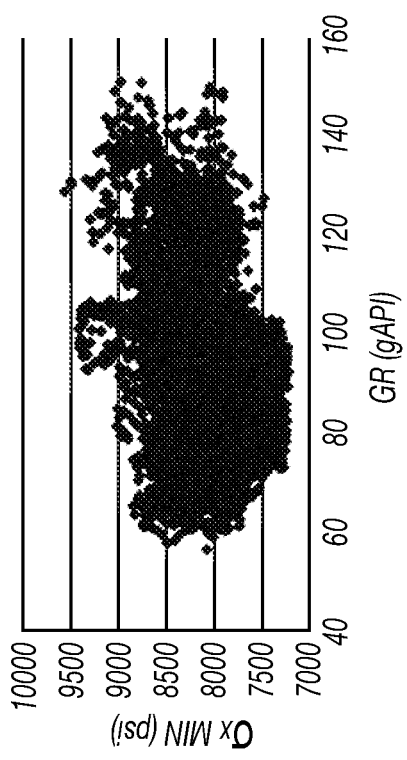
FIG. 6.1
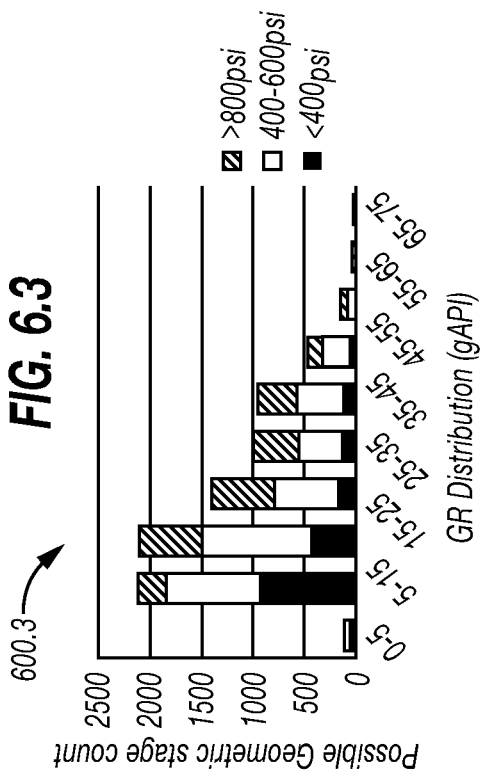
FIG. 6.3

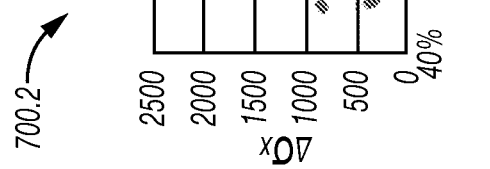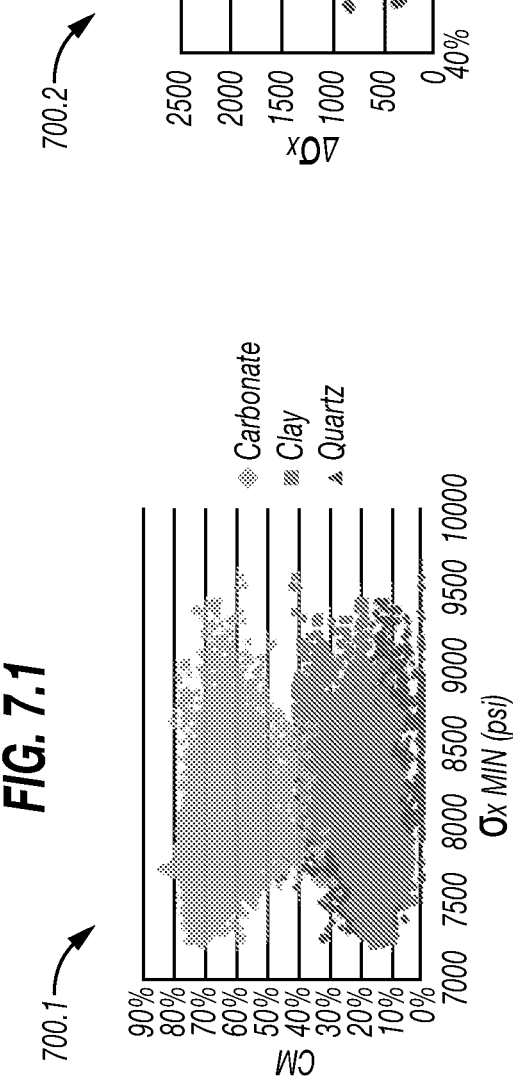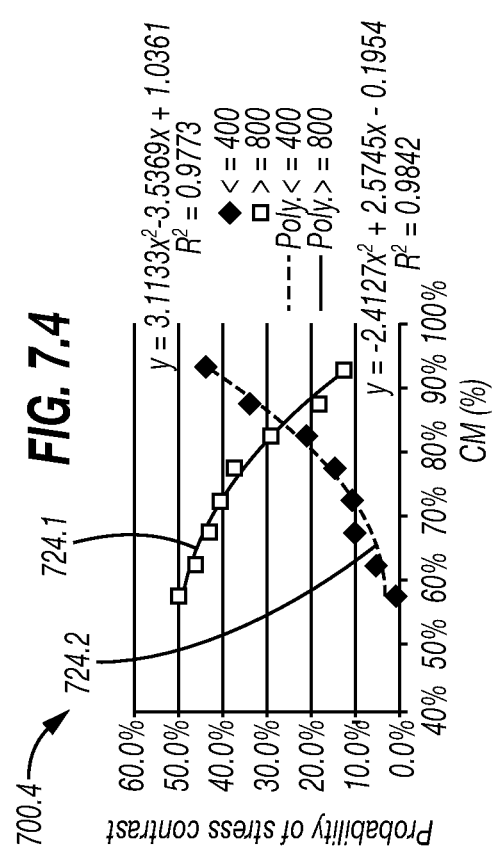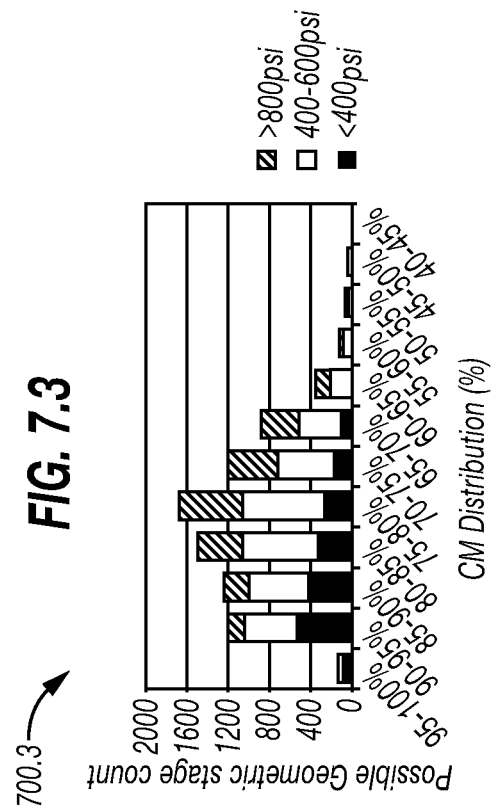
FIG. 7.1
FIG. 7.2
FIG. 7.3
FIG. 7.4

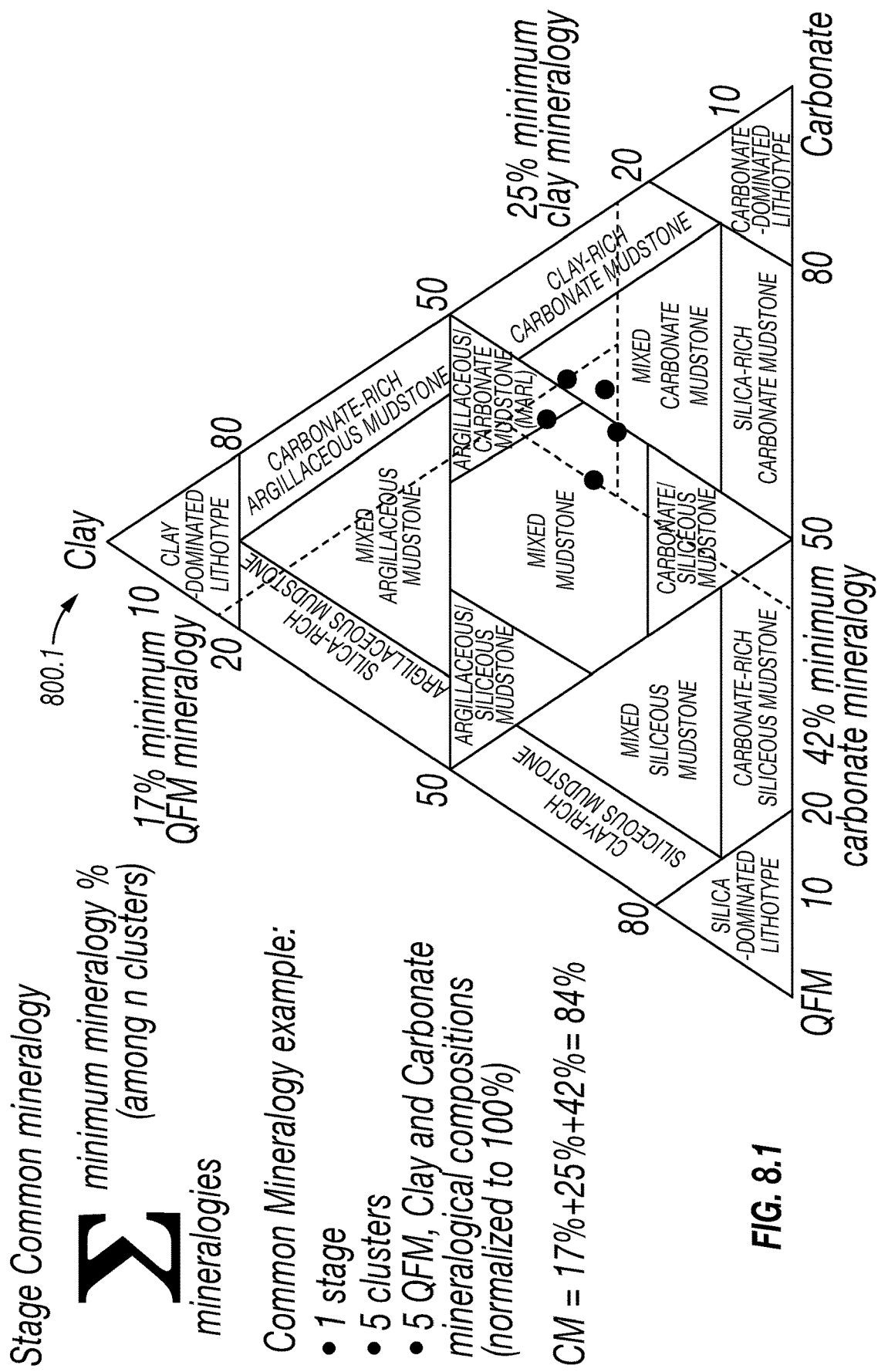
FIG. 8.1

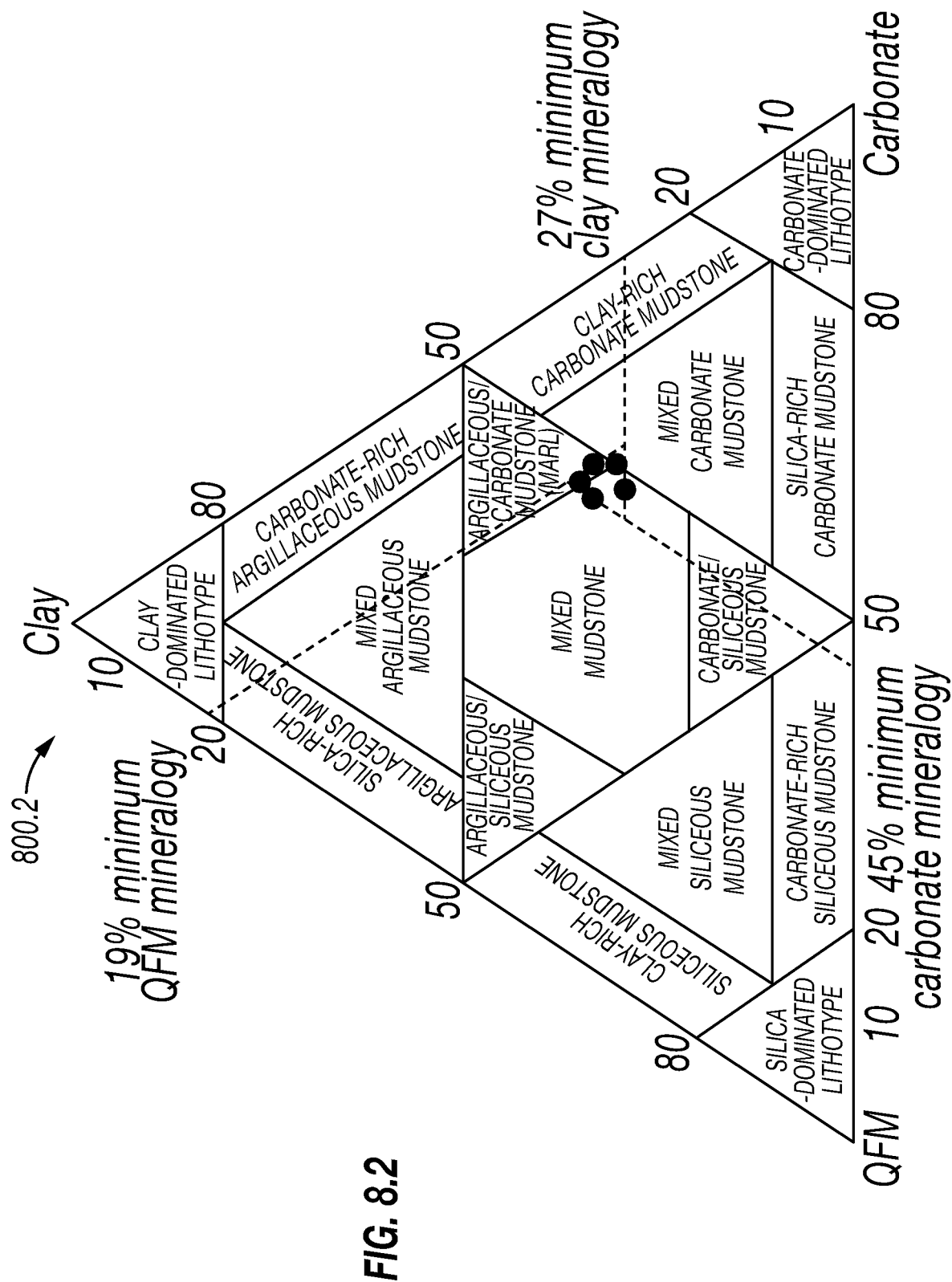
FIG. 8.2

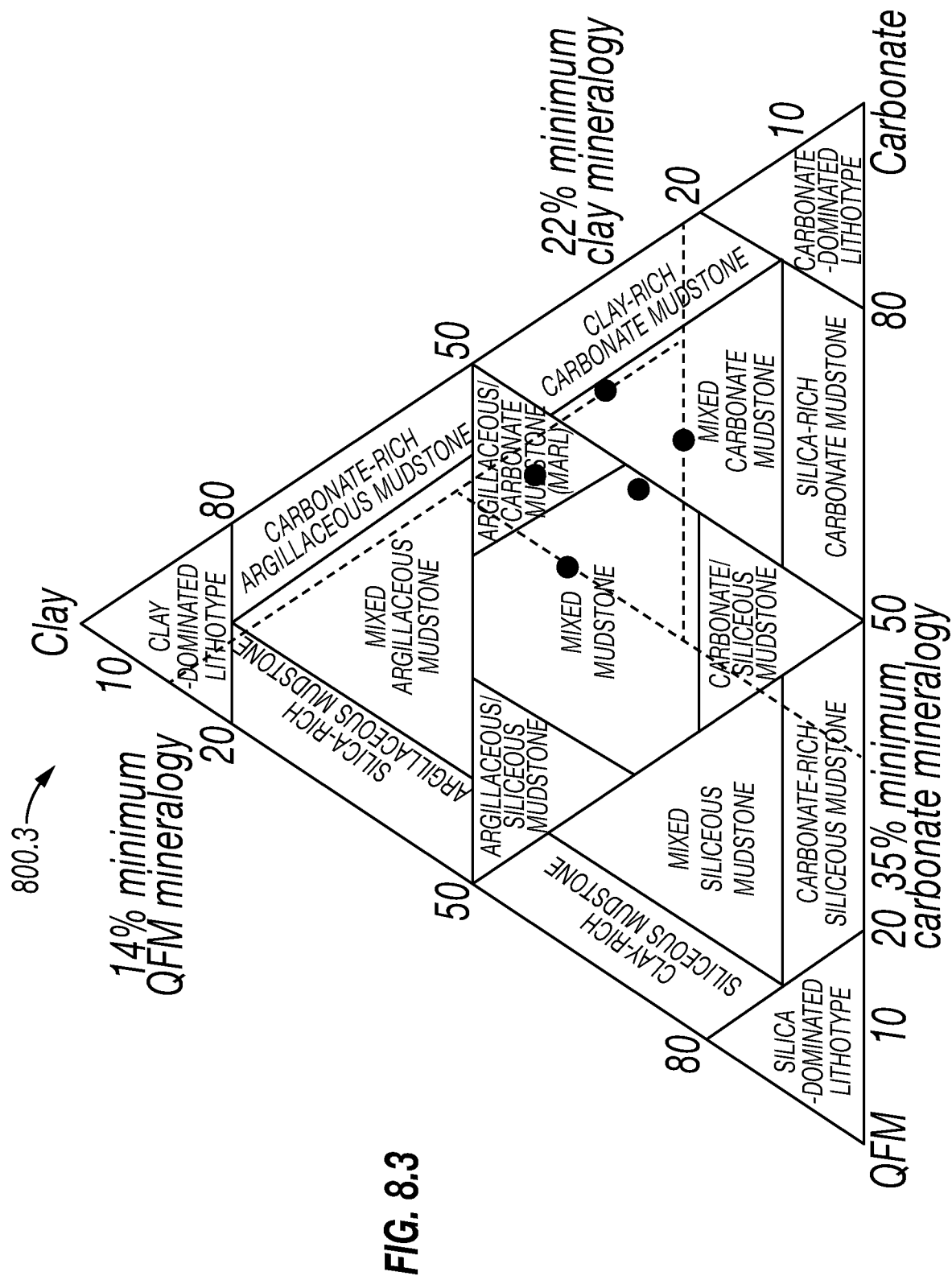
FIG. 8.3

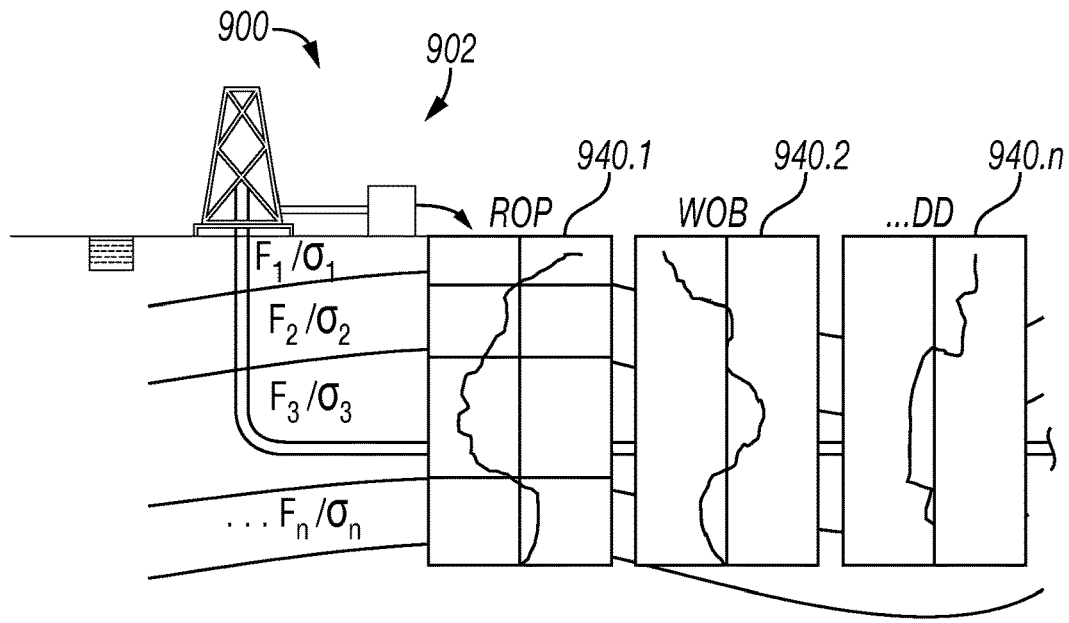
FIG. 9
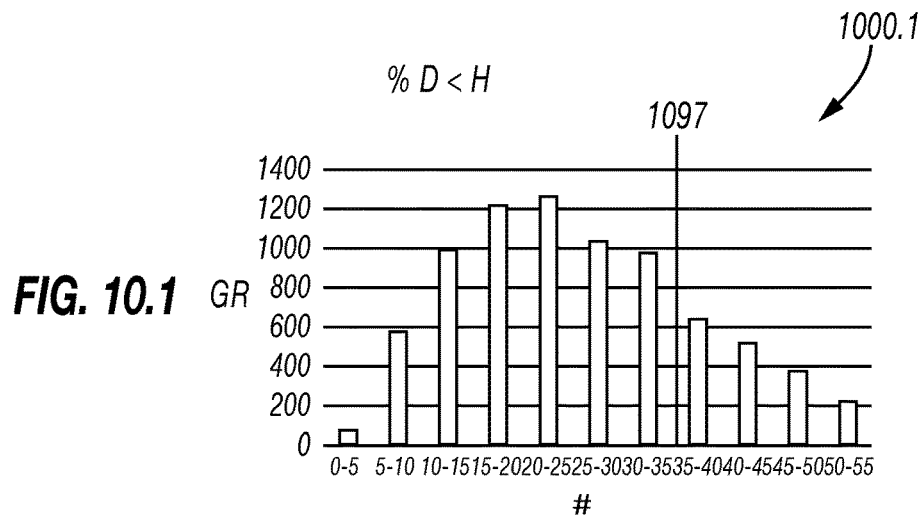
FIG. 10.1
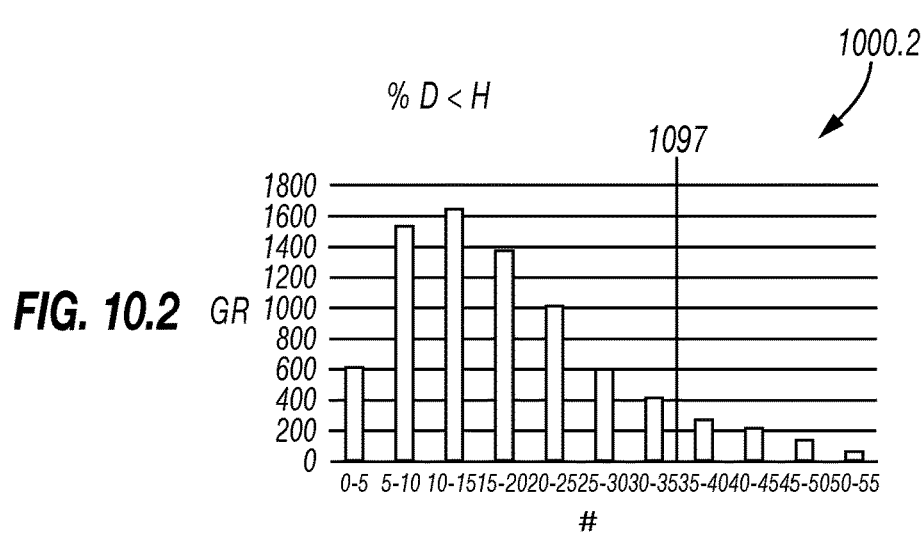
FIG. 10.2

*1100.1 - METHOD OF PERFORMING A PERFORATION OPERATION*

1170.1 - BUILDING A STRESS ASSOCIATION

- 1172 - COLLECTING WELLSITE DATA (E.G., DRILLING DATA AND LOGGING DATA) OF A WELL
  - MEASURING DRILLING DATA (E.G., WOB, ROP, GAMMA, ETC.) DURING DRILLING
  - COLLECTING MINERALOGY SAMPLES DURING DRILLING
  - GENERATING STRESS LOGS (E.G., RESISTIVITY, ANISTROPY, GAMMA ETC.) OF THE WELLBORE (E.G., BY LOGGING THE WELLBORE)
- 1174 - GENERATING A STRESS CONTRAST FOR EACH STAGE OF THE WELL BASED ON THE WELLSITE DATA, THE STRESS CONTRAST COMPRISING A DIFFERENCE BETWEEN MAXIMUM AND MINIMUM STRESSES OF EACH OF THE STAGES
- 1176 - GENERATING A STRESS ASSOCIATION (E.G., CORRELATION, THRESHOLD) BETWEEN THE DRILLING DATA AND THE STRESS LOG
  - GAMMA RAY, MINERALOGY, OR MECHANICAL SPECIFIC ENERGY VS. STRESS
  - PLOTTING, HISTOGRAM, OR DISTRIBUTION
- 1178 – COMPARING THE STRESS ASSOCIATIONS TO OTHER ASSOCIATIONS AND/OR WELLSITE DATA
- 1180 - ADJUSTING THE STRESS ASSOCIATIONS BASED ON THE COMPARING

1182 - APPLYING THE STRESS ASSOCIATION TO A NEW WELL

- 1184 - DRILLING A NEW WELL AND COLLECTING NEW WELLSITE DATA OF THE NEW WELL, THE NEW WELLSITE DATA COMPRISING DRILLING DATA OF THE NEW WELL
- 1186 - GENERATING A NEW STRESS CONTRAST FOR EACH STAGE OF THE NEW WELL OF THE WELLSITE BASED ON THE NEW WELLSITE DATA (E.G., DRILLING DATA) AND THE STRESS ASSOCIATIONS
- 1187 - GENERATING A PRODUCTION FORECAST OF THE NEW WELL USING THE GEOMETRIC COMPLETION DESIGN FOR THE NEW WELL AND A PREDICTED PRODUCTION FORECAST OF THE NEW WELL BASED ON THE NEW STRESS CONTRAST DISTRIBUTION AND AN EC DESIGN
- 1188 - COMPARING A COST OF THE NEW STRESS LOG OF THE NEW WELL WITH A CHANGE IN REVENUE BETWEEN THE GC PRODUCTION FORECAST AND THE PREDICTED PRODUCTION FORECAST
- 1190 - SELECTIVELY PERFORATING THE NEW WELL USING THE GEOMETRIC COMPLETION DESIGN OR THE ENGINEERED COMPLETION DESIGN BASED ON THE COMPARING

*FIG. 11.1*

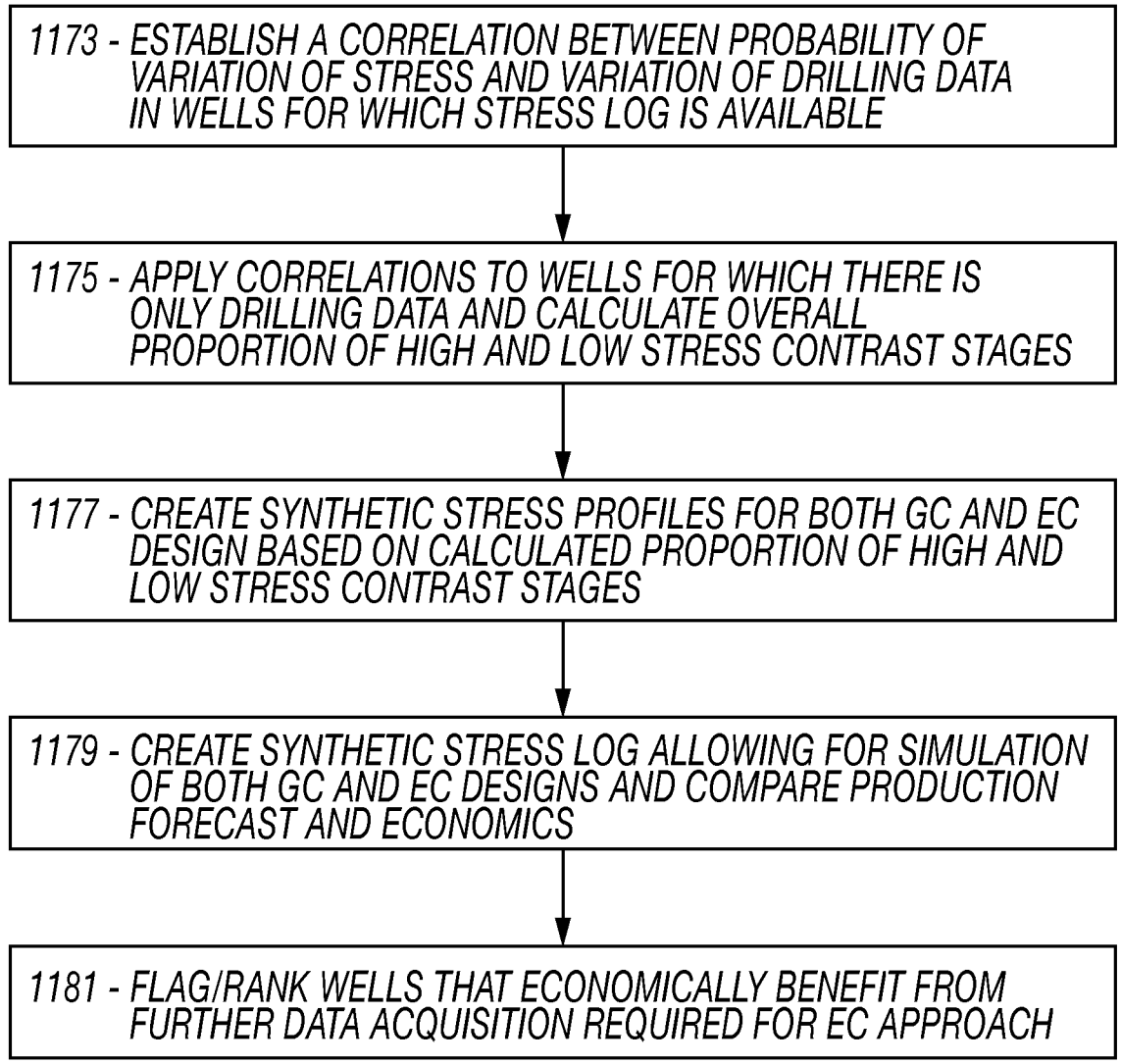
FIG. 11.2

METHOD OF PERFORMING A PERFORATION USING SELECTIVE STRESS LOGGING

CROSS-REFERENCE TO RELATED APPLICATIONS

The application claims the benefit of U.S. Provisional Application No. 62/269,396, filed on Dec. 18, 2015, the entire contents of which are hereby incorporated by reference herein.

BACKGROUND

The present disclosure relates generally to methods and systems for performing wellsite operations. More particularly, this disclosure is directed to methods and systems for facilitating production by performing stimulation operations, such as perforation operations.

Wellbores are drilled to locate and produce hydrocarbons from reservoirs located within subsurface formations. The wellbores may be formed by deploying a drilling tool from a surface rig and advancing the drilling tool through layers of the formation. The drilling tool and/or a separate measurement tool, such as a logging tool, may be used to collect measurements about the wellbore. Examples of wellbore measurements are provided in US patent/application Nos. US20140214324, US2012150515, U.S. Pat. Nos. 7,526,385, 7,042,802, and 5,841,135, the entire contents of which are hereby incorporated by reference herein.

In order to facilitate the recovery of hydrocarbons from oil and gas wells, the formations surrounding such wells can be stimulated using hydraulic fracturing. Hydraulic fracturing may be used to create cracks in subsurface formations to allow oil or gas to move toward the well. The formation may be fractured, for example, by deploying a downhole tool into a wellbore, and creating perforations along the wall of the wellbore, and then injecting fluid into the formation through the perforations. Examples of perforation techniques are described in US patent/application Nos. U.S. Pat. Nos. 8,540,024, 7,918,279, 8,126,646, and 9,228,425, the entire contents of which are hereby incorporated by reference herein.

Fluid (e.g., an "injection fluid", "fracturing fluid", "slurry", etc.) may be pumped through the perforations and into the surrounding formation under pressure to crack the formation. The cracks define pathways to allow fluid from subsurface reservoirs to pass into the wellbore for production to the surface.

Despite the advances in perforation techniques, there remains a need to perform perforation operations in a manner that is cost effective and/or more effectively facilitates the operations in a manner that is cost effective and/or more effectively facilitates the production of hydrocarbons at the wellsite. The present disclosure is directed at meeting such need.

SUMMARY

A method of performing a perforation operation at a wellsite is disclosed. The method involves generating a stress contrast distribution for each perforation stage of a well based on drilling stress data and a stress log of the well, generating a stress association between the drilling stress data and the stress log; generating a new stress contrast distribution for each of the stages of a new well based on new wellsite data (including new drilling stress data) of the new well and the stress association, generating a production forecast using the geometric completion (GC) design and a predicted production forecast based on the new stress contrast distributions and an engineered completion (EC) design, comparing a cost of a new stress log of the new well with a change in revenue between the geometric completion design production forecast and the predicted production forecast of the engineered completion design, and selectively perforating the new well using the GC or EC design based on the comparing, whereby stress logging may be selectively performed.

The method may also involve drilling the well at the wellsite and measuring wellsite data comprising drilling stress data, and logging the well and generating the stress log, drilling the new well at the wellsite and measuring the new wellsite data comprising the new drilling stress data. The method may also involve, if a change in between the production forecast and the predicted production forecast revenue comprises an increase in revenue which is greater than the cost of the new stress log, then logging the new well and defining an engineered completion design based on the stress logging, and perforating the new well using the engineered completion design whereby stress logging may be selectively performed.

The method may also involve, if the change in revenue comprises an increase in revenue which is greater than the cost of the new stress log, then logging the new well, defining the engineered completion design based on the stress logging, and perforating the new well using the engineered completion design; if the change in revenue is less than the cost of the new stress log, then forming perforations in the new well by perforating the new well using the geometric completion design. The method may also involve injecting stimulation fluid into the formation through perforations in the formation and producing fluid from the well.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of the system and method for generating a hydraulic fracture growth pattern are described with reference to the following figures. The figures are not necessarily to scale and certain features and certain views of the figures may be shown exaggerated in scale or in schematic in the interest of clarity and conciseness.

FIGS. 2.1 and 2.2 are schematic views illustrating wells drilled through formations having low and high stress contrast, respectively;

FIGS. 3.1 and 3.2 are schematic diagram illustrating perforation stages of a wellbore using geometric completion (GC) and engineering completion (EC) design, respectively;

FIG. 4 is a graph illustrating stress contrast for each stage of a wellbore having GC and EC design, respectively;

FIGS. 5.1 and 5.2 are graphs illustrating production forecasts for GC and EC design in wells with low and high stress contrast, respectively;

FIGS. 6.1-6.4 are graphs illustrating correlations between stress contrast and gamma ray contrast;

FIGS. 7.1-7.4 are graphs illustrating correlations between stress contrast and Common Mineralogy (CM);

FIGS. 8.1-8.3 are schematic diagrams illustrating CM calculation, CM for clusters in similar rock, and CM for clusters in different rock, respectively;

FIG. 9 is a schematic diagram illustrating a stress association based on changes in measured drilling data;

FIGS. 10.1 and 10.2 are histograms illustrating stress contrast association based on weighted gamma ray contrast distributions for a high and low average stress contrast wells, respectively; and FIGS. 11.1 and 11.2 are flow charts illustrating example methods of performing perforation operations.

DETAILED DESCRIPTION

Figure 1:
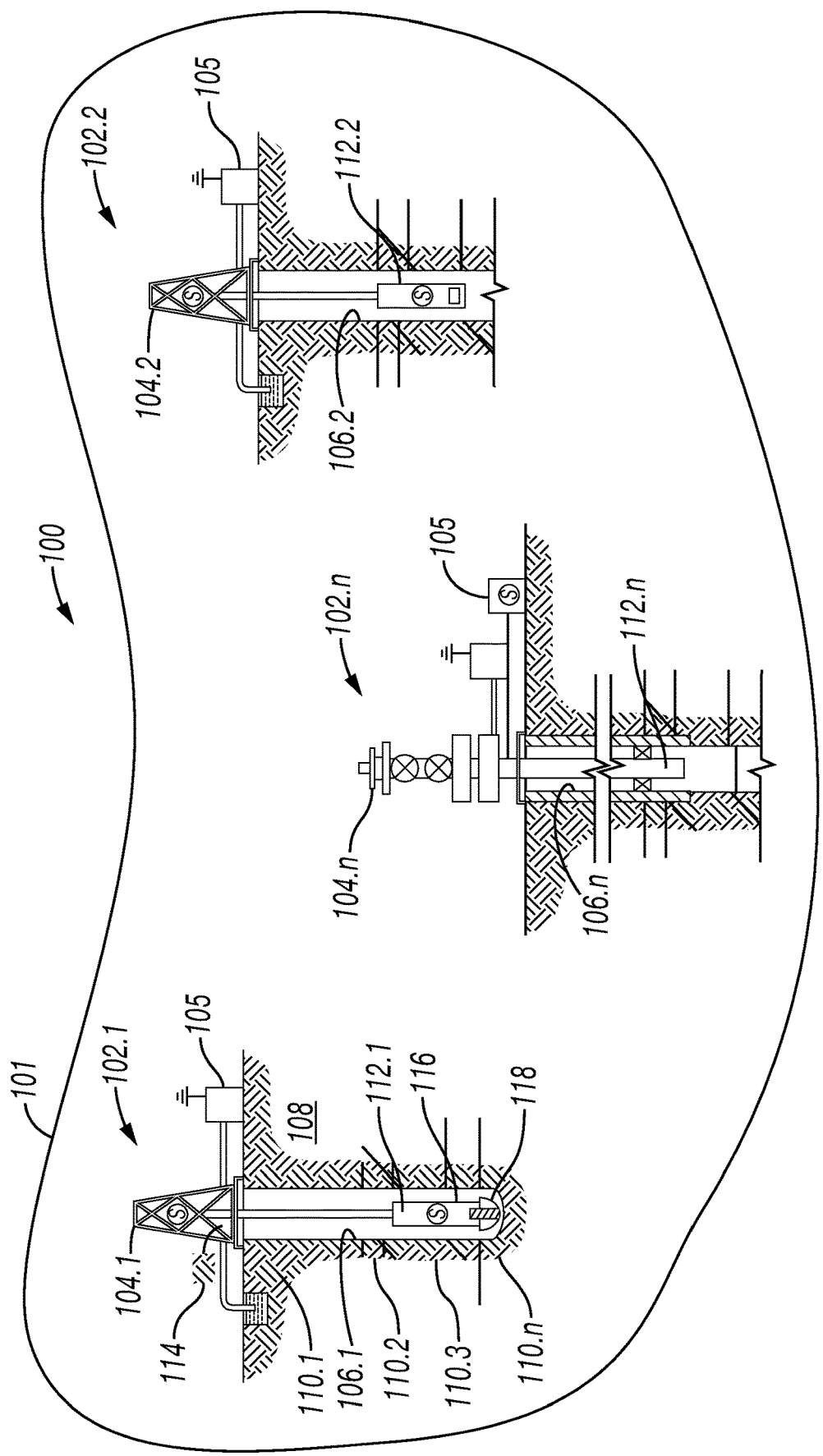
FIG. 1 is a schematic view illustrating a wellsite with multiple wells, each well depicting various oilfield operations.

The description that follows includes apparatuses, methods, techniques, and instruction sequences that embody techniques of the inventive subject matter. However, it is understood that the described embodiments may be practiced without these specific details.

This disclosure relates to methods for performing perforation operations. These methods involve selective placement of perforation stages along the wellbore based on differences in formation stresses along the wellbore. Placement may be determined by generating stress associations based on wellsite data for a well, and applying a correlation to additional wells of a wellsite. The stress associations may be generated by determining correlations between drilling data variation and stress logs variation, changes in measured data during drilling and/or weighted histograms of drilling data Multi-stage wells perforated with multiple clusters per stage can be under stimulated when the stress contrast between the clusters is high, as stimulation treatment may preferentially go into clusters of lower stress, leaving the higher stress clusters unstimulated. This under-stimulation of higher stress clusters may lead to lower than expected productivity. Stress contrast between clusters can be minimized by selecting the depth of the stages and/or perforation clusters. The stress association(s) may be used to identify the magnitude of changes in rock formations, and/or to alter placement of the perforations for optimal stimulation. Depending on the conditions and costs associated with the well, the perforations may be placed according to a predetermined geometric completion (GC) design or altered to an engineered completion (EC) design based on the stress association. In other words, the perforation stages may be placed along the wellbore in locations where stress contrast (variation in stresses) is decreased (or balanced). When placed along low contrast stress locations, the perforations may have similar pressures applied thereto, which may cause the perforations to open in a similar manner during fracturing and facilitate production through the perforations. This balanced placement may be used to assure that more of the perforations within the stages are able to crack during fracturing to generate production flow from subsurface reservoirs.

The stress associations may also be used to determine if the stress contrast along the wellbore is large enough to justify logging the wellbore and/or adjusting the location of the perforations. Where an average change in stress is above a predetermined level, the stress contrast may indicate that the variation is high enough to prevent certain perforations from cracking and negatively impact production. In such cases, additional costs associated with stress logging may be outweighed by increased production, and stress logging may be performed to identify optimal stage locations along the wellbore.

Oilfield Operations

FIG. 1 schematically illustrates a wellsite 100 for performing oilfield operations. The wellsite 100 includes multiple wells 102.1-102.$n$ (three are depicted in this example) on a pad 101. Each well 102.1-102.$n$ is shown performing a different operations, including drilling, logging, and production, respectively. Each well includes a surface rig 104.1-104.$n$ and a surface unit 105 positioned about a wellbore 106.1-106.$n$ penetrating a formation 108 with multiple layers 110.1-110.$n$. Each rig 104.1-104.$n$ has a downhole tool 112.1-112.$n$ deployed into the wellbores 106.1-106.$n$, respectively.

The well 102.1 schematically shows the drilling rig 104.1 deploying a drilling tool 112.1 into the formation 108 via a conveyance to form the wellbore 106.1. The rig 104.1 may be provided with devices, such as kellys, elevators, rotating tables, pipe handlers, and other surface equipment, for operating the drilling tool 112.1. Sensors (S) may be positioned about the rig 104.1 to collect surface drilling measurements, such as weight on bit (WOB), rate of penetration (ROP), etc.

The drilling tool 112.1 may be a conventional drilling tool including a bottomhole assembly (BHA) 116 with a bit 118 at an end thereof used to cut away portions of the formation 108 as the drilling tool 112.1 advances into the formation 108. During drilling mud is pumped from a mud pit, through the drilling tool 112.1 and out the bit 118 to lubricate the bit 118 and generate cuttings 114 of the formation. Portions of the formation are pumped to the surface with the cuttings 114. As schematically shown, samples of the cuttings 114 may be gathered at the surface for analysis.

The BHA 116 of the drilling tool 112.1 may include various devices, such as communication, power, measurement, and/or other components. The BHA 116 is shown as having a measurement device (S), such as a measurement while drilling (MWD), logging while drilling (LWD), sensors, gauges, and/or other devices, for collecting downhole drilling measurements, such as gamma ray, resistivity, and/or other measurements. Such measurements may be transmitted from the drilling tool 112.1 to the surface unit 105 via the conveyance or via wireless transmission.

Data collected from the rig 104.1, the drilling tool 112.1, the cuttings 114, and/or other sources may be collected and/or analyzed. The surface unit 105 may be provided with devices, such as communication, processing (CPU), input/output, databases, and/or other devices, for collecting, storing, analyzing, and/or communicating the data and/or information generated therefrom. The data may be communicated to onsite and/or offsite facilities for further processing. Information generated therefrom may be used to make decisions and/or take action at one or more wells at the wellsite.

The well 102.2 schematically shows a wireline tool 112.2 deployed via a conveyance from the surface rig 104.2 and into the wellbore 106.2. The wireline tool 112.2 may be a conventional wireline tool deployed into the wellbore 106.2 to collect measurements and/or to take samples. The wireline tool 112.2 may include one or more components, such as sensors, gauges, logging, sampling, communication, power, and/or other components. The sensors (and/or logging tool) (S) may be provided with resistivity, gamma ray, sonic, Electromagnetic, nuclear magnetic resonance, and lithological composition measurements, and/or other devices for collecting geomechanical (including stress) and petrophysical data, and/or other measurements. These measurements may be passed to the surface unit 105 via the conveyance and/or wirelessly in a similar manner to that of the drilling tool 112.1.

The well 102.n schematically shows a production tool 112.n deployed from a Christmas tree 104.n into the wellbore 106.n via a conveyance (e.g., tubing) for producing fluids from subsurface formations and to a surface location. The production tool 112.n as shown includes devices to receive and pass fluids from the formation through the tubing and to the surface. The production tool 112.n may include one or more measurement devices, such as sensors, gauges, and/or other measurement devices (S). These measurement devices (S) may be coupled directly or indirectly to the surface unit 105 for passing measurements to the surface unit 105 in a similar manner to that of the drilling tool 112.1.

While the wellsite 100 is depicted as a land-based wellsite with three wells performing specific operations, it will be appreciated that one or more wells may be present and may be performing various operations, such as drilling, measuring, testing, stimulating, producing, and/or other oilfield operations. Also, while the downhole tools, surface rigs, surface units, sensors, and/or other wellsite equipment are shown in specific configurations, various equipment may be provided for performing various oilfield operations and gathering data associated therewith. The wells may be cased or uncased, and/or land-based or offshore.

Perforation Operations

FIGS. 2.1 and 2.2 schematically illustrate perforation operations 200.1, 200.2 at wells 202.1, 202.2. The wells 202.1, 202.2 may represent one or more of the wells of FIG. 1 and/or an additional well that may be at the wellsite 100. Each well 202.1, 202.2 is depicted as having a wellbore 206.1, 206.2 passing through one of more formation layers F1-Fn and a simulation tool 212 for generating clusters of perforations P in stages S1-Sn along the wall of the wellbore. Each well 200.1, 200.2 is also depicted as having stresses σ1-σn about the wellbore due to changes in formation parameters about the layers F1-Fn of the formation.

As shown in FIG. 2.1, a stimulation tool 212 is shown deployed into the well 202.1 for performing a stimulation operation. The stimulation operation may be performed, for example, to stimulate production at the wellsite 100 (FIG. 1). The stimulation tool 212 may be, or include, a perforating tool, which may be a conventional perforating tool capable of creating perforations along stages (S1-Sn) defined along the wall of the wellbore 206.1. The stimulation tool 212 is deployed from a surface rig 204 into the wellbore 206.1 for performing the perforation operation. The perforations may be created, for example, by deploying the stimulation tool 212 to a given location, and firing a projectile from the stimulation tool 212 and into the formation. As shown, stages of the perforations may be positioned at various depths about the wellbore 206.1. The stimulation tool 212 may also have other devices, such as an injector for passing fluids through the perforations and into the formation to crack the formation and create flow pathways between reservoirs in the formation and the well.

As also shown in FIG. 2.1, the formation has multiple layers F1-Fn of various types of rock. Each layer may have variations in geological properties, such as stresses σ1-σn. These variations may be detected using, for example, measurements from the drilling and/or logging tools of FIG. 1. The wellbore is depicted as extending vertically through multiple layers and horizontally through a single layer of the formation.

A graph 220.1 shows an example of plot of rock stresses σ (y-axis) at various depths D (x-axis) along the wellbore. Perforations P of the well are shown on the graph. As indicated by this graph, depending on the location of the perforation, the rock stresses at each of the locations may vary. These variations in stresses for groups of clusters within a stage define a "stress contrast", namely a difference between a maximum stress and a minimum stress (σmax−σmin). In this case, the stress contrast CL is relatively low (e.g., less than about 400 psi (2758 kPa) of variation).

FIG. 2.2 is similar to FIG. 2.1, except that both the vertical and horizontal wellbore passes through multiple layers F1-Fn of the formation. The corresponding graph 220.2 shows that the stress contrast Ch is high (e.g., more than about 800 psi (5516 kPa) of variation) due to the changes in rock properties at each of the layers. The perforations P corresponding to the rock stresses σ1-σn at each location may also vary.

FIGS. 3.1 and 3.2 schematically depict perforation stages S1-Sn about portions of a well 302, and the corresponding stress contrasts C, C' along the well for each stage. These figures show stages S1-Sn, each consisting of multiple clusters of perforations P1-Pm at depths D1-Dm about the wellbore 300. Each perforation P1-Pm for a given stage has a length L, phasing/orientation α, and diameter φ.

As schematically shown in FIG. 3.1, stress a versus depth D of the formation adjacent the well 300 is also depicted. A stress contrast C for each of the perforations P1-Pm with fixed geometric spacing Sp therebetween is also depicted. The stress contrast C1-Cm along the wellbore varies at each depth D1-Dm for each perforation cluster P1-Pm. As schematically shown in FIG. 3.2, the stress contrast C1-Cn can be lowered when the spacing Sp can be adjusted for each perforation cluster (Sp1-Spm−1) so that the perforation clusters are located in rock or similar stress.

While FIGS. 3.1 and 3.2 show as specific arrangement of stages, perforations, stresses, and geometry, each of these may be varied. Changes in well, equipment, formation, customer needs, costs, and/or other factors may alter the geometry, measurements, and associated design.

FIGS. 3.1 and 3.2 also show examples of Geometric Completion (GC) designs and Engineered Completion (EC), respectively. The location of stages and perforation clusters about the wellbore 300 (e.g., in cased-hole horizontal wells) may be defined using GC or EC design. As indicated by these figures, the GC design may be altered to EC to increase the production flow into the wellbore.

As demonstrated by FIG. 3.1, the GC design is based on standard geometry, such as stage length, number of clusters per stage and cluster spacing along the well. The GC design may provide, for example for the same geometric configurations of perforations at given depth intervals along the well. In at least some cases, the GC design may result in numerous clusters filing to contribute to production due to uneven stimulation (e.g., little or no proppant in clusters with higher stress).

Where the stress contrast C is high, as shown in FIG. 3.1 the pressures along the different perforations may affect the ability to inject fluid through certain perforations and crack the formation adjacent thereto. This may also affect the ability to create a hydraulic fracture (Hf) and draw fluid into the formation as indicated by the arrows. The stress variation along the stages may affect fluid flow to the perforations, and not all perforations are able to generate hydraulic fractures Hf sufficient to produce fluid. An adjustment may be needed to allow more perforations to generate production.

As schematically shown in FIG. 3.2, the GC design may be modified to an EC design tailored to the stress variations of the well to reduce the stress contrast from C of FIG. 3.1 to C' of FIG. 3.2 by varying the spacing Sp between the perforation clusters to provide for various spacing Sp1-Spm−1. Where the stress contrast C' is low, as shown in stage Sn of FIG. 3.2, the pressures are relatively consistent across the stages, thereby providing a balance which allows the injection fluid to evenly apply to each perforation and create hydraulic fractures (Hf) thereabout. In this case, hydraulic fractures are possible about each perforation and fluid may be permitted to flow into the well via the perforations as indicated by the arrows.

The EC design may be used to maximize the number of active producing clusters by maximizing the number of stimulated clusters. The EC design starts from the standard stage length, number of clusters per stage and cluster spacing provided by the GC design as shown, for example, by Sp of FIG. 3.1. The specific length of each stage, number of clusters per stage and cluster spacing Sp may then be adjusted on the basis of wellsite data, such as downhole stress log, to minimize the stress contras between stage clusters. As shown in FIG. 3.2, the spacing Sp1-Spm−1 has been adjusted from the spacing Sp of FIG. 3.1. This EC approach may result in wells having a lower average stress contrast, and may have no stages with high stress contrasts.

A perforation design may be provided which defines the location of the stages along the wellbore and the predefined spacing Sp therebetween. The cluster perforation spacing may also define the number of perforations and their corresponding geometry about the wellbore. The cluster perforation spacing may be adjusted based on the stress contrast to provide an EC design with, for example, adjusted spacing to vary the spacing Sp between the stages. The spacing may be adjusted to align the perforation stages with select formations based on data, such as stress logs.

FIGS. 4, 5.1 and 5.2 graphically depict comparisons between GC and EC design. As demonstrated by these examples, the stress contrast may be reduced and the production increased when the design is altered based on the stresses along the well. FIG. 4 is a graph 400 depicting an example of stage stress contrast between GC and EC designs. This graph 400 plots pressure P versus stage index SI along the wellbore. In this case, the adjustment of the perforation locations from the GC to the EC design results in a reduction of the overall average stress (from σavg to σavg') and eliminates high stress contrast stages. The average stress contrast for EC design reduced to about 125 psi (862 kPa) versus 525 psi (3620 kPa) for GC design.

Additionally, some data indicates that, for wells with a high average stress contrast when completed geometrically, up to 30-50% of all perforation clusters may not contribute to production when wells are completed with a GC design. In wells completed with an EC design, less than from about 15% to about 25% of the perforation clusters may contribute to production, resulting in about a 10% to about 30% incremental productivity over the GC design.

FIGS. 5.1 and 5.2 are graphs 500.1, 500.2 depicting production forecasts for a wellbore with EC and GC for high and low stress contrasts, respectively. These figures plot production PROD (e.g., cumulative gas production (MMSCF)) versus time (months).

These graphs may be generated by modeling the wells based on known drilling and other wellsite data to determine predicted production for a given well with certain stresses perforated using a GC design. A similar model may be made by estimated adjustments to the GC design based on known drilling data. The modeling may be performed, for example, using fracture simulation software, such as MANGROVE® commercially available from SCHLUMBERGER TECHNOLOGY CORPORATION®.

As indicated by FIGS. 5.1 and 5.2, economic value of an EC design may vary from well to well. FIG. 5.1 shows EC and GC design production forecast comparison in a well where stress variation is marginal (e.g., does not vary sufficiently along the lateral). FIG. 5.2 shows EC and GC design production forecast comparison in a well where stress variations are more than marginal (e.g., vary sufficiently along the lateral).

The production outcome in each case may determine whether taking action, such as adjusting perforation design, is financially justified. Due to the high cost of stress logging, a minimum increase in production may be required before logging may be performed. The stress logging may be needed to properly identify the stresses along the wellbore used to provide the EC design.

In wells placed in marginal reservoirs, the incremental production resulting from the use of an EC design may not justify the cost of logging the well (e.g., FIG. 5.1). Similarly, in a well where stress does not vary sufficiently along the lateral, the incremental production resulting from the use of an EC design may not justify the cost of logging the well due to the limited incremental production resulting from the EC design over the GC design base case. In a well where stress varies sufficiently along the lateral (e.g., FIG. 5.2) drilled in medium-high quality reservoirs, the logging and EC design may result in optimized wells that produce more than the GC design and payback for the investment within an acceptable time frame.

Completing all wells with a GC design may not be the optimum way to develop a pad (or sector) as some (and sometimes most) of the wells may have benefited in terms of production from and EC design. Similarly, gathering data on all wells and completing them with an EC design may not necessarily be the most economical approach as some of the wells may not pay back for the log investment. Understanding which wells may benefit from investing in data acquisition and EC design without logging them is not a simple task as it may be the logs that allow for the GC and EC designs to be compared in terms of post-stimulation well productivity.

In order to properly evaluate whether a GC design may be used, or whether an EC design and the corresponding costs of logging may be justified, a better understanding of the stresses of the well may be examined. Information gleaned from the stress and logging data of one well may be applied to other wells using stress associations to determine if GC or EC design for the new wells may be justified.

Stress Associations

Attempts have been made to derive stress from drilling data. However, associations between individual drilling data and stress may be weak. Stress depends on many parameters, such as vertical depth, overburden, mechanical properties (Young's modulus and Poisson's ratio), fabric (lamination, planes of weakness, etc.) of the rock, and pore pressure and tectonic forces (Eq. 1). No single parameter dominates stress as indicated by the following closure stress equation:

$$\sigma_{x(H\ min)} - P_{p(H)} = \frac{v}{1-v}[\sigma_v - P_{p(V)}] + \frac{E}{1-v^2}(e_x + ve_y) \tag{1}$$

where σ is stress, Pp(H) is pore pressure, Pp(v) is pore pressure, E is Young's Modulus, ν is Poisson's ratio, and e is tectonic strain.

FIGS. 6.1-10.2 depict various example techniques that may be used to determine associations between stress contrast and drilling data contrast. Such techniques may involve, for example, correlations between drilling data contrast and stress contrast (FIGS. 6.1-8.3), changes in measured drilling data (FIG. 9), and weighted histograms of drilling data (FIGS. 10.1 and 10.2). The stress association used may depend on the availability of certain types of data. In each of the example cases provided, drilling data may be used as the stress association. Drilling data may involve the use of various data, such as gamma ray measurement (e.g., standard gamma ray (GR) or spectral gamma ray (SGR)), mineralogical composition (e.g., percentage by volume or weight of minerals measured from cuttings or derived from LWD data, rock typing), drilling parameters (e.g., rate of penetration (ROP), weight on bit (WOB), torque or rotations per minute (RPM) measured during drilling, ratios of drilling parameter, such as rate of penetration per rotation (ROP/RPM), mechanical specific energy (MSE), etc.), and/or wellbore trajectory data (e.g., measured depth, vertical depth as well as their derivation such as azimuth, deviation and dog leg severity (DLS)).

Correlations may be used when various types of data are available. Even when drilling data alone is available for consideration in determining stress contrast associations, a first level processing may be performed on the drilling data by creating data sets similar to those created to establish correlation using the same A data points a given B distance from each other, with A being the GC design number of clusters per stage and B being the GC design cluster spacing (possible clusters). Second level processing may be performed on each data set similar to what is done to establish the correlation, e.g., calculating variations of the drilling data sets. A third level processing may involve the calculation of probabilities of high and low stage stress contrast. This may be done by calculating the difference between the higher and lower value of stress and drilling data for all possible cluster scenarios to obtain the well-level distribution of stress and drilling data contrast in the well.

FIGS. 6.1-6.4 are graphs 600.1-600.4 demonstrating how the relations between drilling data contrast, such as gamma ray measurements taken during drilling, and stress contrast is established. These graphs demonstrate an example process of correlation between drilling data and stress. Graph 600.1 plots σxmin (y-axis) versus gamma ray (x-axis) which appears to show a lack of any correlation.

A second level processing is performed on each data set (referred as the variation of the data), and can be any of the following: Range=max(data set)−min(data set) for each data set of A clusters with a spacing distance of B.

A third level processing on the data involves establishing the distribution of stress variation (high and low stress contrast thresholds) versus data variation. Such processing generates two datasets: probability of high stress contrast versus drilling data contrast value, and probability of low stress contrast versus data contrast value. Linear, polynomial, logarithmic or exponential trend lines can be used to extract simple equations that become the correlations used for the second part of the workflow.

Graph 600.3 is a stacked histogram plotting possible stage counts versus GR distribution. This histogram provides a count of cluster groups with high (e.g., above about 800 psi (5516 kPa)), medium (e.g., from about 400 to about 800 psi (2758 kPa-5516 kPa)), and low stress variations (e.g., below about 400 psi (2758 kPa)), and the corresponding distribution of GR contrast. As shown in graph 600.4, this provides a probability of high and low stress contrast versus GR contrast by plotting data points according to those measurements from graph 600.3 that fall within the low and high stress variation ranges. Trend lines 624.1, 624.2 for the high and low stress contrasts may be fit based on the generated data provided.

FIGS. 7.1-7.4 are example graphs 700.1-700.4 depicting correlation building using Common Mineralogy (CM) versus stress. CM is a measure of anisotropy between different rocks associated with specific single-stage clusters depth. In this scenario, mineralogical compositions by weight or volume are simplified into three main groups: Carbonates, Clays and QFM (quartz and feldspar minerals). Once normalized to 100%, the minimum percentages for each mineral group may be summed into what is defined as the CM. That number may be close to 1 if all clusters of rock composition are almost identical and close to 0 if all clusters of rock composition are extremely distinct.

FIGS. 8.1-8.3 schematically depict CM of cuttings from a well. The cuttings may be generated during drilling as shown, for example, in FIG. 1. As shown by diagrams 800.1-800.3 of FIGS. 8.1-8.3, CM for certain minerals with high contrast (FIG. 8.2) or low contrast (FIG. 8.3) may be determined using the calculation of FIG. 8.1. FIG. 8.1 is an illustration of the CM concept showing how the following calculation is applied to clusters of different mineralogy:

$$\Sigma_{mineralogies} \text{ minimum mineralogy \% (among } n \text{ clusters)} \quad (2)$$

The CM may be similar for some species of rock. The formula may be used to determine CM for a given rock. FIG. 8.2 is an example of a high CM involving clusters in very similar rock. FIG. 8.3 is an example of low CM involving clusters in very different rock.

Referring back to FIGS. 7.1-7.4, Graph 700.1 is a plot of raw mineralogy (RM) data (y-axis) versus minimum horizontal stress σxmin (x-axis). This plot depicts raw data mineralogy for three minerals, namely carbonate, clay and quartz. This plot appears to show an apparent lack of correlation. Graph 700.2 is a plot of minimum horizontal stress variation (Δσxmin) versus common mineralogy (CM). This graph indicates a low correlation, but notable feature of low stress contrast in high CM variation and high stress contrast in low CM variation environment.

The data from FIGS. 7.1 and 7.2 may be replotted to further understand the relationship between stress and the mineralogy of the rock. Graph 700.3 shows cluster groups for possible geometric stage counts with high, medium, and low stress variations plotted against distribution of CM variation. As in FIG. 6.4, the high and low points from graph 700.3 are applied to graph 700.4 to provide the probability of stress contrast versus CM (%). Trend lines 724.1, 724.2 through the high and low data points respectively are provided. These trend lines show good correlation (e.g., r-square greater than about 0.8).

When correlation cannot be established due to unsuitability of data type or data set, an estimate of stress contrast distribution can still be established using the drilling data changes and/or MSE contrast as depicted in FIG. 6 and/or the drilling data distribution as depicted in FIGS. 7.1 and 7.2.

FIG. 9 shows an example stress association 900 based on a review of the changes in measured drilling data at each depth. Such changes may be an indication of changes in formation layers. FIG. 9 is a schematic diagram of a well 902 extending into a formation with layers F1-Fn and corresponding stresses σ1-σn.

FIG. 9 also includes graphs 940.1-940.n of drilling data, including ROP, WOB, and other drilling data (DD), measured during drilling. These graphs are aligned with the formation to show stress variations indicating changes in rock based on drilling data. The shifts in data along the graphs may indicate a change in layer, which may be used to derive stresses variation σ1-σn in the multi-layer environment. As shown by this figure, the stresses of a given layer may have similar measurements of various drilling data, such as ROP, WOB, RPM, ROP/RPM, trajectory, measured depth, vertical depth, azimuth, deviation, DLS, etc. Although direct associations may be weak, it may be assumed that nearby clusters located in the same formation layer (or rock) may have low stress contrast between them, while nearby clusters located in different rock may have a higher stress contrast between them.

FIGS. 10.1 and 10.2 are graphs 1000.1, 1000.2 depicting another example using weighted histograms to illustrate stress distributions. Each graph 1000.1, 1000.2 plots gamma ray measurements for each perforation along the well. A vertical threshold line 1097 is defined along the graphs indicating where a % of the gamma ray measurements fall. The line 1097 may be defined along the histogram to determine whether a well has a high or low proportion of high stress contrast.

In the example case of FIG. 10.1, the well has a large histogram proportion of high GR contrast falls below line 1097 which indicates that the well is likely to have a high proportion of high stress contrast stages. As shown in the example case of FIG. 10.2, wells with a small histogram proportion of high GR contrast fall below line 1097 may indicate that the well is likely to have a low proportion of high stress contrast stages.

Associations between histogram populations above a high threshold and proportion of high stress contrast stages, and histogram populations below a low threshold and proportion of low stress contrast stages can be established using histogram distribution and stress data on the wells where both data is available. Such associations can then be extended to wells for which the drilling data alone is available.

While FIGS. 6.1-10.2 show example stress contrast associations that may be made based on drilling and/or stress logs, one or more of these and/or other stress associations may be used to detect potential changes in stress and/or formation layers usable in perforation design, such as GC and/or EC design. The various association techniques may also be compared for validation and/or to detect any data errors.

FIGS. 11.1 and 11.2 are flow charts depicting methods 1100.1, 1100.2 of performing a perforation operation. FIG. 11.1 depicts a method 1100.1 of performing a perforation operation involving perforating based on stress associations. FIG. 11.2 is a method 1100.2 of performing perforation operations involving building a stress correlation. These methods may be used to build the stress associations for a well of a wellsite based on drilling and logging data, and applying these associations to a new well to determine whether to perforate using GC or EC designs.

The method 1100.1 involves building the stress association 1170.1 for a well of a wellsite, and 1182 applying the stress association 1170.1 to another (new) well. The stress association may be a stress correlation, changes in drilling measurements, or stress histogram distribution defined along the well based on the wellsite data (see, e.g., FIGS. 6.1-10.2). The stress association may define, for example, a relationship between the stress contrast distributions of a first logged well and another well before it is logged. The association may be used, for example, to predict stresses and resulting impact on production for deciding whether stress logging and EC design is financially justified.

The stress association 1170.1 may be determined by 1172 collecting wellsite data (e.g., drilling stress data and logging data) of the well. The wellsite data comprises drilling data (e.g., WOB, ROP, etc.) and logging data (e.g., sonic, resistivity, anisotropy, gamma, etc.). The drilling data may be generated from drilling logs, drilling sensors, mineralogy samples, etc. The data may be generated at the wellsite by measuring, logging, sampling, etc. The data may also be collected from other sources, such as client data, operator input, etc.

The method continues with 1174 generating a stress contrast distribution for each of the stages of the well (e.g., S1-Sn of FIGS. 2.1-2.1). The stress contrast distribution may be determined by plotting the stresses versus depth. For each defined possible set of clusters in a given stage along the wellbore, the stress contrast distribution (e.g., maximum minus minimum stress at the clusters) for each stage may be determined.

Next, the method continues with 1176 generating a stress association between the drilling stress data and data from the stress log for each of the stress contrast distributions. The stress association may be generated using, for example, the method 1100.2 of FIG. 11.2. Examples of stress associations are described further herein.

The stress association may be validated 1178 by comparing the associations to other associations and/or wellsite data. The stress association may also be adjusted 1180 to remove data errors and/or to align with the other associations and/or wellsite data. Examples of calibrating techniques (which may be used for the validating) are provided in US Patent Application No. 2014/0372089, the entire contents of which are hereby incorporated by reference herein.

The stress association may be applied 1182 to the new well to determine whether to perforate using GC or EC design. The applying 1182 may involve 1184 drilling a new well and collecting new wellsite data (e.g., new drilling data) of the new well. The applying 1182 further involves 1186 generating a high and low stress contrast probability for each stage of the new well of the wellsite based on the new wellsite data and the stress association.

Next, a decision may be made as to whether to proceed with a GC or EC design. To do so, the method involves 1187 generating a production forecast of the new well using the GC design and a predicted production forecast of the new well based on the new stress contrast distributions and an EC design. The forecasts may be performed using synthetic models for GC and EC design.

The production forecasts may involve applying a distribution of high and low stress contrast probability along the stages of the wellbore on the basis of the drilling data variation along the wellbore. Synthetic stress logs may be created for both GC and EC scenarios by assigning a stress level to each perforation cluster based on each stage stress contrast distribution for GC and based on a given EC stress contrast distribution for EC design. Completion design and production forecasts may be simulated to compute the value of the incremental production and evaluate the economic value of the EC approach and its associated incremental data acquisition.

The method continues by 1188 comparing a cost of the new stress log of the well with a change in revenue between the GC production forecast and the predicted production forecast. See, for example, the production comparisons of FIGS. 5.1, 5.2. The production forecasting may be performed using simulations as is described further herein. The new well may then be selectively perforated 1190 using the GC or the EC design based on the comparing. The well may then be stimulated and fluids produced from the surrounding formation.

Where the production impact indicates that the predicted production forecast for EC design generates sufficient increased production to outweigh the cost of a stress log, the stress log is performed and the EC design is generated based on the stress contrast distribution. Where the production impact is insufficient, no log is performed and GC design may be performed. A production analysis may be performed to determine if the production forecast increase is higher than the cost of logging.

Wells for which the incremental production generated by the EC approach makes the incremental data acquisition economical are flagged for logging. This can be done while the well is still being drilled. A given portion of the well (e.g., at least 50% of the well) may need to be drilled for the flag to be meaningful. For groups of wells that have already been and which are pending stimulation, the same workflow can be applied to identify (cased well can be logged with cased-hole tools).

The production impact may be a point where revenue difference from forecast productions for EC may be incremental and may not exceed the logging cost. This production impact also may be, for example, a point at which an average stress contrast of the GC for the new well is low enough (e.g., below 400 psi (2758 kPa) to allow each cluster of perforations within a stage to be stimulated without diversion, or a point at which an average stress contrast of the GC for the new well is too high to allow each cluster of perforations within a stage to be stimulated without diversion. If the stress contrast is too high, a few clusters may crack while the others do not (see, e.g., FIG. 3.2).

FIG. 11.2 shows another example method 1100.2 of performing perforation operations. The method 1100.2 may be used alone or with the method 1100.1 of FIG. 11.1 (e.g., 1170.1 and/or 1182). The method 1100.2 involves building stress correlations between stress and drilling data in wells which have been stress logged. The method 1100.2 involves 1173 establish correlation between probability of variation of stress and variation of drilling data in wells for which stress log is available. See, e.g., FIGS. 6.1-7.4. Correlations between drilling data and stresses may be examined to determine a relationship between stress and drilling data, such as gamma ray and mineralogy. Drilling data such as measurement while drilling (MWD) data and their interpretation, logging while drilling (LWD) data and their interpretation, drilling parameter, wellbore trajectory, and cuttings analysis can be processed in a manner that generates probabilities of high and low stress contrast for sets of clusters. These correlations may be based on a principle that variation of drilling data is correlated to variation in the rock, itself correlated to stress contrast.

The method 1100.2 continues by 1175 applying the correlations to wells for which there is drilling data alone, and calculating an overall proportion of high and low stress contrast stages. Modeling may be performed (using, e.g., MANGROVE®) to 1177 create synthetic stress profiles for both GC and EC design based on calculated proportion of high and low stress contrast stages. The process 1173-1177 used to create the synthetic stress profiles for GC and EC may be repeated for multiple scenarios. For selected GC and EC profiles, 1179 synthetic stress logs may be created to allow for simulation of both GC and EC designs and compare production forecast and economics. See, e.g., FIGS. 5.1 and 5.2. Based on the modeling, wells may be 1181—flagged/ranked based on which economically benefit from further data acquisition required for EC approach.

Once correlations are established on a well for which both drilling data and stress log are available, these correlations can be used on near-by wells for which drilling data alone is available to create synthetic GC and EC design that can be compared to evaluate the economic value of the EC design and associated data gathering. This method may allow for wells to be evaluated during the drilling phase as data is gathered to produce a real-time decision that triggers the mobilization of logging tools or not based on the economic analysis. This process can also be used on large groups of wells that are cased-cemented and are waiting to be stimulated. Wells among such a large group that have the potential to economically benefit the most from an EC design may be flagged for logs (e.g., cased-hole logs) and EC design.

Part or all of the methods (and or various combinations of the methods) may be performed in any order and repeated as desired.

Although the present disclosure has been described with reference to embodiments and implementations thereof, the present disclosure is not to be limited by or to such embodiments and/or implementations. Rather, the systems and methods of the present disclosure are susceptible to various modifications, variations and/or enhancements without departing from the spirit or scope of the present disclosure. Accordingly, the present disclosure expressly encompasses all such modifications, variations and enhancements within its scope.

It should be noted that in the development of any such actual embodiment, or numerous implementation, specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the embodiments used/disclosed herein can also include some components other than those cited.

In the description, each numerical value should be read once as modified by the term "about" (unless already expressly so modified), and then read again as not so modified unless otherwise indicated in context. Also, in the description, it should be understood that any range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to a few specific ones, it is to be understood that inventors appreciate and understand that any and all data points within the range are to be considered to have been specified, and that inventors possessed knowledge of the entire range and all points within the range.

The statements made herein merely provide information related to the present disclosure and may not constitute prior art, and may describe some embodiments illustrating the invention. All references cited herein are incorporated by reference into the current application in their entirety.

Although only a few example embodiments have been described in detail above, those skilled in the art will readily appreciate that many modifications are possible in the example embodiments without materially departing from the system and method for performing the integrated oilfield (e.g., fracture and production) operations. Accordingly, all such modifications are intended to be included within the scope of this disclosure as defined in the following claims. In the claims, means-plus-function clauses are intended to cover the structures described herein as performing the recited function and not only just structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method of performing a perforation operation at a wellsite, the wellsite positioned about a subterranean formation, the wellsite having a geometric completion design for perforating stages along a well of the wellsite, the method comprising:
    generating a stress contrast distribution for each of the stages of the well based on wellsite data of the well, the wellsite data comprising drilling stress data and a stress log of the well, the stress contrast distribution comprising a difference between maximum and minimum stress for each of the stages;
    generating a stress association between the drilling stress data and data from the stress log;
    generating a new stress contrast distribution for each of the stages of a new well based on new wellsite data of the new well and the stress association, the new wellsite data comprising new drilling stress data of the new well;
    generating a production forecast of the new well using the geometric completion design for the new well and a predicted production forecast of the new well based on the new stress contrast distributions and an engineered completion design;
    comparing a cost of the stress log of the new well with a change in revenue between the geometric completion design production forecast and the predicted production forecast of the engineered completion design; and
    selectively perforating the new well using one of the geometric completion design and the engineered completion design based on the comparing whereby stress logging may be selectively performed.

2. The method of claim 1, wherein, if the change in revenue between the production forecast and the predicted production forecast exceeds the cost of the new stress log, performing the stress log, adjusting the geometric completion design to the engineered completion design, and perforating the new well according to the engineered completion design.

3. The method of claim 1, wherein, if the cost of the new stress log exceeds the change in revenue between the production forecast and the predicted production forecast, perforating the new well according to the geometric completion design.

4. The method of claim 1, wherein the new drilling stress data comprises gamma ray data of the new well and the stress association comprises a stress correlation between the gamma ray data and the stress data.

5. The method of claim 1, wherein the new drilling stress data comprises mineralogy of cuttings from the new well and the stress association comprises a stress correlation between the mineralogy and the stress data.

6. The method of claim 1, wherein the new drilling stress data comprises mechanical specific energy and the stress association comprises a stress correlation between the mechanical specific energy and the stress data.

7. The method of claim 1, wherein the stress association comprises a percent distribution of the drilling stress data about a histogram.

8. The method of claim 1, further comprising validating the stress association by comparing the stress association with another stress association.

9. The method of claim 8, further comprising adjusting the stress association and the another stress association based on the comparing.

10. The method of claim 1, further comprising generating the drilling stress data and the new drilling stress data by at least one of sensing drilling parameters at the wellsite, measuring parameters of cuttings from the wellbore, and logging the wellbore during drilling.

11. A method of performing a perforation operation at a wellsite, the wellsite positioned about a subterranean formation, the wellsite having a geometric completion design for perforating stages along a well of the wellsite, the method comprising: drilling the well at the wellsite and measuring wellsite data comprising drilling stress data; logging the well and generating a stress log; generating a stress contrast distribution for each of the stages of the well based on the wellsite data of the well, the wellsite data comprising the drilling stress data and the stress log, the stress contrast distribution comprising a difference between maximum and minimum stress for each of the stages; generating a stress association between the drilling stress data and data from the stress log; drilling a new well at the wellsite and measuring new wellsite data comprising new drilling stress data; generating a new stress contrast distribution for each of the stages of the new well based on the new wellsite data of the new well and the stress association, the new wellsite data comprising the new drilling stress data of the new well; generating a production forecast of the new well using the geometric completion design for the new well and a predicted production forecast of the new well based on the new stress contrast distribution and an engineered completion design; comparing a cost of a new stress log of the new well with a change in revenue between the geometric completion design production forecast and the predicted production forecast of the engineered completion design; if the change in revenue comprises an increase in revenue which is greater than the cost of the new stress log, then logging the new well and defining the engineered completion design based on the logging; and perforating the new well using the engineered completion design whereby stress logging may be selectively performed.

12. The method of claim 11, further comprising injecting the new well and producing fluid from the new well.

13. The method of claim 11, further comprising if the change in revenue is less than the cost of the new stress log, then perforating the new well using the geometric completion design.

14. A method of performing a perforation operation at a wellsite, the wellsite positioned about a subterranean formation, the wellsite having a geometric completion design for perforating stages along a well of the wellsite, the method comprising: drilling the well at the wellsite and collecting wellsite data comprising drilling stress data; logging the well and generating a stress log; generating a stress contrast distribution for each of the stages of the well based on the wellsite data of the well, the wellsite data comprising the drilling stress data and the stress log, the stress contrast distribution comprising a difference between maximum and minimum stress for each of the stages; generating a stress association between the drilling stress data and data from the stress log; drilling a new well at the wellsite and measuring new wellsite data comprising new drilling stress data; generating a new stress contrast distribution for each of the stages of the new well based on the new wellsite data of the new well and the stress association, the new wellsite data comprising the new drilling stress data of the new well; generating a production forecast of the new well using the geometric completion design for the new well and a predicted production forecast of the new well based on the new stress contrast distribution and an engineered completion design; comparing a cost of a new stress log of the new well with a change in revenue between the geometric completion design production forecast and the predicted production forecast of the engineered completion design; if the change in revenue comprises an increase in revenue which is greater than the cost of the new stress log, then logging the new well, defining the engineered completion design based on the logging, and perforating the new well using the engineered completion design; if the change in revenue is less than the cost of the new stress log, then forming perforations in the new well by perforating the new well using the geometric completion design; injecting stimulation fluid into the formation through the perforations in the formation; and producing fluid from the well.

15. The method of claim 14, further comprising generating the engineered completion design based on the new drilling data and the geometric completion design.

16. The method of claim 14, wherein the collecting comprises measuring the drilling data during drilling and collecting mineralogy samples during drilling.

17. The method of claim 14, wherein the generating a stress association comprises: establishing a correlation between a probability of variations of stress and variation of the drilling data in one or more wells of the wellsite for which the stress log is available; applying the correlations to the wells for which there is only drilling data and calculating overall proportion of stages with high and low stress contrast distribution; creating synthetic stress profiles for both the geometric completion and engineered completion design based on the calculated proportion of the stages with the high and low stress contrast distribution; creating a synthetic stress log allowing for simulation of both the geometric completion and engineered completion design based on calculated proportion of the stages with the high and low stress contrast distributions; and ranking wells that economically benefit from further data acquisition required for the engineered completion design.

\* \* \* \* \*